(12) United States Patent
Fukumoto et al.

(10) Patent No.: US 11,531,368 B2
(45) Date of Patent: Dec. 20, 2022

(54) INFORMATION PROCESSING DEVICE

(71) Applicant: SEIKO EPSON CORPORATION, Tokyo (JP)

(72) Inventors: Hiroaki Fukumoto, Shiojiri (JP); Ryuji Moriyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 16/817,239

(22) Filed: Mar. 12, 2020

(65) Prior Publication Data

US 2020/0290385 A1 Sep. 17, 2020

(30) Foreign Application Priority Data

Mar. 15, 2019 (JP) .............................. JP2019-048154

(51) Int. Cl.

| | |
|---|---|
| *B41J 3/46* | (2006.01) |
| *G06F 1/16* | (2006.01) |
| *B41J 29/393* | (2006.01) |
| *G06F 3/041* | (2006.01) |
| *G06K 15/00* | (2006.01) |
| *B41J 29/13* | (2006.01) |
| *B41J 29/02* | (2006.01) |

(52) U.S. Cl.
CPC .............. *G06F 1/1601* (2013.01); *B41J 3/46* (2013.01); *B41J 29/02* (2013.01); *B41J 29/13* (2013.01); *B41J 29/393* (2013.01); *G06F 3/041* (2013.01); *G06K 15/005* (2013.01)

(58) Field of Classification Search
CPC ............... B41J 3/46; B41J 29/02; B41J 29/13
See application file for complete search history.

(56) References Cited

U.S. PATENT DOCUMENTS

2014/0205356 A1* 7/2014 Mistyurik ............ G01G 19/415
400/613

FOREIGN PATENT DOCUMENTS

| JP | 08244311 A * | 9/1996 |
| JP | 2009-105557 | 5/2009 |
| JP | 2014-016917 | 1/2014 |
| JP | 2014-086960 | 5/2014 |
| JP | 2017-100412 | 6/2017 |

\* cited by examiner

*Primary Examiner* — Sharon Polk
(74) *Attorney, Agent, or Firm* — Workman Nydegger

(57) ABSTRACT

Provided is a printer, which serves as an information processing device and which includes: a housing; a cover including a first surface, in which an opening is formed, the cover being configured to pivot about an axis of a first rotating shaft parallel to the first surface; and a touch panel, which is to be located in the opening when the cover is in a closed state in which the cover covers the housing. The cover includes a frame between an edge of the first surface and the opening.

5 Claims, 7 Drawing Sheets

INFORMATION PROCESSING DEVICE

The present application is based on, and claims priority from JP Application Serial Number 2019-048154, filed Mar. 15, 2019, the disclosure of which is hereby incorporated by reference herein in its entirety.

BACKGROUND

1. Technical Field

The present disclosure relates to an information processing device.

2. Related Art

An information processing device such as a printer or a multifunction machine in which a printer and other functions are combined includes a touch panel through which a user can perform various input operations by touching a guide image displayed in a display with a finger of the user. For example, JP-A-2014-16917 discloses an information apparatus serving as an information processing device for reducing a sensitivity of a touch panel in order to prevent an unintentionally erroneous input into the touch panel by a user. The information processing device in JP-A-2014-16917 reduces the sensitivity of the touch panel to prevent an erroneous input when a cover is in an opened state.

A user may contact the touch panel when the user opens a cover in a closed state. However, in the information processing device of JP-A-2014-16917, the sensitivity of the touch panel remains high when the cover is in the closed state, and thus, an erroneous input may be caused if the user unintentionally contacts with the touch panel.

SUMMARY

An information processing device according to the present application includes a cover including a first surface in which an opening is formed, the cover being configured to pivot about an axis of a first rotating shaft parallel to the first surface, a housing to which the first rotating shaft is coupled, and a touch panel which is to be located in the opening when the cover is in a closed state where the cover covers the housing. The cover includes a frame between an edge of the first surface and the opening.

In the information processing device described above, the cover may include a second surface and a third surface, which are coupled to the first surface, and the first surface, the second surface, and the third surface may intersect one another.

In the information processing device described above, the touch panel may include a fourth surface serving as a front surface and may be configured to pivot about an axis of a second rotating shaft parallel to the fourth surface. In the closed state, the first surface and the fourth surface may be parallel to each other.

In the information processing device described above, in a state in which the first surface and the fourth surface are parallel to each other, the second rotating shaft may be provided along an end of the touch panel at a side away from the first rotating shaft, and may overlap the touch panel in plan view.

In the information processing device described above, the cover may be coupled to the housing through a damper configured to attenuate a rotating speed of the cover pivoting about the axis of the first rotating shaft.

DESCRIPTION OF EXEMPLARY EMBODIMENTS

Figure 1:
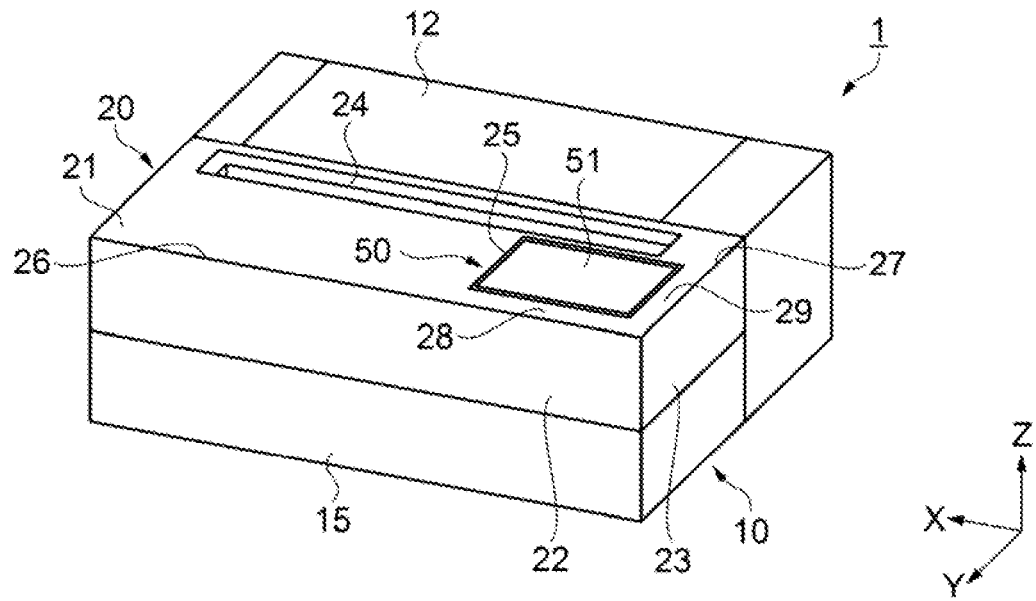
FIG. 1 is a perspective view illustrating a schematic configuration of a printer according to an embodiment.

Embodiments of the present disclosure will be described below with reference to the accompanying drawings. The following are embodiments of the disclosure and are not intended to limit the disclosure. Note that the respective drawings may be illustrated not-to-scale, for illustrative clarity. Additionally, in the coordinates illustrated in the drawings, both directions along a Z-axis are up and down directions where a direction indicated with an arrow is "above", both directions along an X-axis are left and right directions where a direction indicated with an arrow is "left", both directions along the Y-axis are front and back directions where a direction indicated with an arrow is "front", and a X-Y plane is a "horizontal plane". In addition, the both directions along the X-axis correspond to a main scanning direction, and the Y-axis corresponds to a transport direction.

1. Embodiment

In the embodiment, an ink-jet type printer 1 for ejecting droplets onto a medium M to record an image or the like by will be described for an example of an information processing device.

Figure 2:
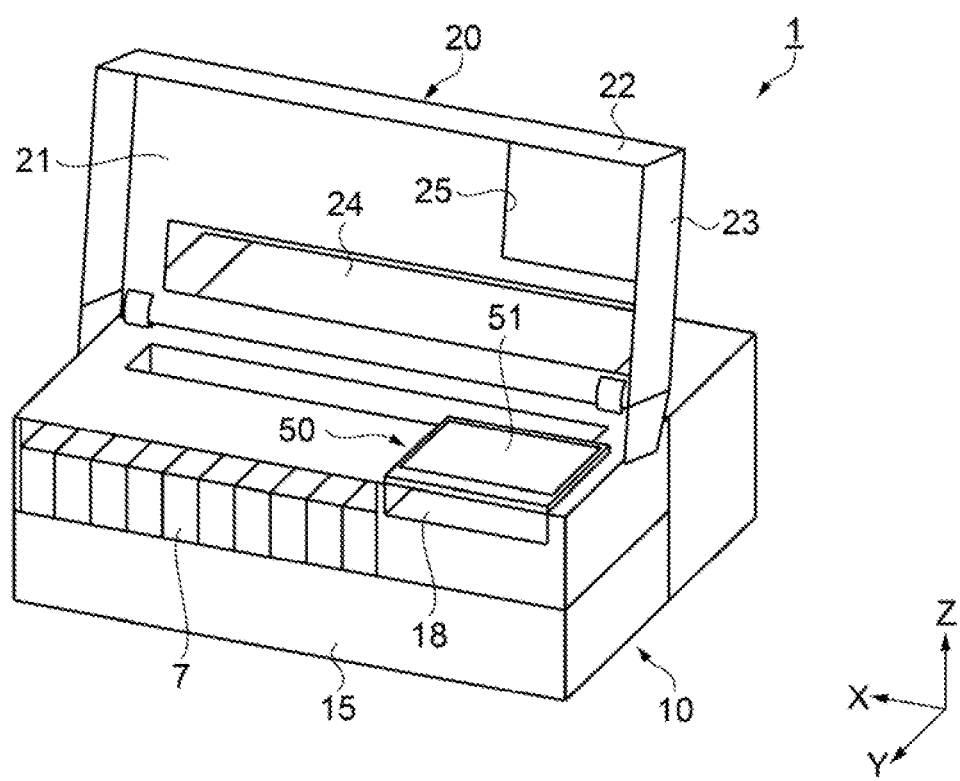
FIG. 2 is a perspective view illustrating the printer when a cover is in an opened state.
Figure 3:
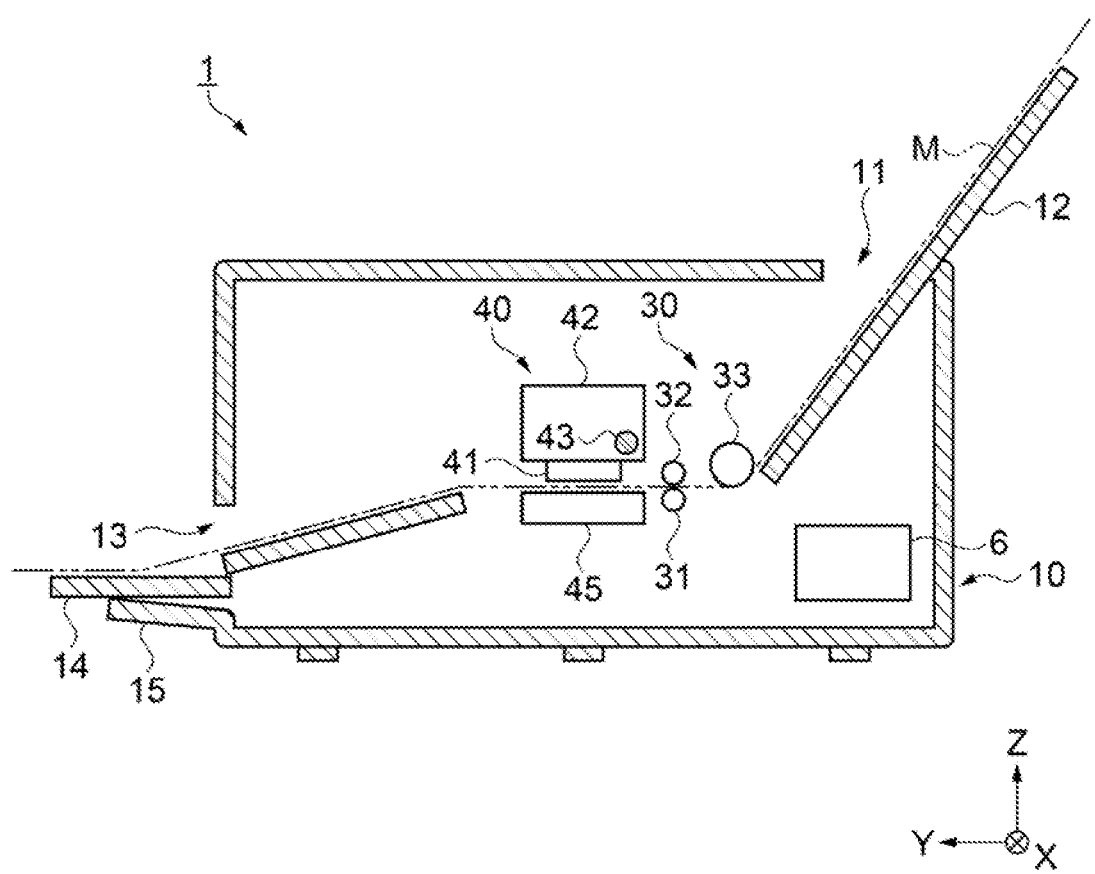
FIG. 3 is a schematic cross-sectional view illustrating an internal configuration of the printer.

FIG. 1 is a perspective view illustrating a schematic configuration of the printer 1 according to the embodiment. FIG. 2 is a perspective view illustrating the printer 1 when a cover 20 is in an opened state. FIG. 3 is a schematic cross-sectional view illustrating an internal configuration of the printer 1. Note that in FIG. 3, a transport path along which the medium M is transported is indicated by a two-dot chain line.

First, a configuration of the printer 1 serving as an information processing device will be described with reference to FIG. 1 to FIG. 3. The printer 1 includes a housing 10 having a substantially rectangular parallelepiped shape elongated along the X-axis, a touch panel 50 provided on a upper face of the housing 10, and the cover 20 covering the upper face of the housing 10.

A medium supply port 11 configured to supply the medium M into the housing 10 is provided at a rear part of the upper face of the housing 10. On a back side of the medium supply port 11, a plate-like medium support 12 configured to support a back side of the medium M inserted into the medium supply port 11 is extendably provided such that the medium support 12 protrudes upward of housing 10 from a rear end of the medium supply port 11 according the size of the medium M. The medium support 12 is rotatably coupled to inner walls, as a rotational fulcrum, at both ends along the X-axis of the medium supply port 11. When the medium M is not supplied, the medium supply port 11 is closed by retracting and rotating the medium support 12 so that dust or foreign matter does not enter into the housing 10 from the medium supply port 11.

A medium discharge port 13 configured to discharge a recorded medium to outside of the housing 10 is provided at a lower part of a front face of the housing 10. On a lower surface side of the medium discharge port 13, a plate-like medium tray 14 configured to support the discharged medium M is extendably provided such that the medium tray 14 protrudes frontward of the housing 10 from a lower end of the medium discharge port 13 according to a size of the medium M. When the printer 1 does not perform recording, the medium tray 14 is housed in a lower part of the housing 10 from the medium discharge port 13, and the medium discharge port 13 is closed by a lid 15 rotatably coupled to the inner walls, as a rotational fulcrum, at both ends along the X-axis of the medium discharge port 13.

The printer 1 includes, in the housing 10, a transport unit 30 configured to transport the medium M in the transport direction, a recording unit 40 configured to perform recording on the medium M, and the like, as well as a control unit 6 configured to control operations of the above components.

The transport unit 30 is configured to include a driving roller 31, a driven roller 32, and a guide roller 33, which are located upstream of the recording unit 40 in the transport direction of the medium M and have a shaft length longer than a width of the medium M along the X-axis. The guide roller 33 guides the medium M supplied from the medium supply port 11 at an upper part of the housing 10 to the recording unit 40. The driven roller 32 is pressed against the driving roller 31 via the medium M and is rotated to follow the driving roller 31. The driving roller 31 holds the medium M in between with the driven roller 32, and when the driving roller 31 is rotationally driven by a drive motor (not illustrated), the medium M is transported in the transport direction.

The recording unit 40 includes a recording head 41 configured to eject ink toward the medium M, a carriage 42 configured to hold the recording head 41, a guide shaft 43 configured to guide movement of the carriage 42, a platen 45 configured to support the medium M, and the like. The recording head 41 includes a plurality of nozzles (not illustrated), and is configured to eject the ink. The guide shaft 43 extends in a main scanning direction being a width direction of the medium M, and supports the carriage 42 in a slidable contact state. The carriage 42 holding the recording head 41 reciprocates in the main scanning direction by power of a drive motor (not illustrated). The platen 45 includes a upper face facing the recording head 41, and the upper face includes a substantially rectangular surface with a width direction of the medium M being a longitudinal direction of the platen 45. The medium M is suctioned and supported on the upper face of the platen 45 by a negative pressure applied to the platen 45. This prevents deterioration in recording quality due to lifting of the medium M.

An image, a character, and the like are recorded on the medium M by alternately repeating a sub scanning operation in which the control unit 6 transports the medium M in the transport direction and the main scanning operation in which the ink is ejected from the recording head 41 onto the medium M while the carriage 42 is moved in the main scanning direction. Note that in the embodiment, a serial-head type recording head 41 mounted on the reciprocating carriage and configured to eject the ink while moving in the width direction of the medium M is exemplified for the recording head 41, but a line-head type recording head 41 fixed, arrayed, and extending in the width direction of the medium M may be employed.

At the front face of the housing 10 or at an upper left of the lid 15 when the medium discharge port 13 is covered, an ink tank 7 configured to contain ink to be supplied to the recording head 41 is housed. The ink in the ink tank 7 is supplied through an ink supply path (not illustrated) communicating from the ink tank 7 to the recording head 41. The ink tank 7 contains cyan, magenta, yellow, and black inks including a deep ink composition; light cyan, light magenta, light yellow, and light black inks including a light ink composition; and white, clear inks, and the like. When the printer performs recording, an upper front face of the medium discharge port 13, including the ink tank 7 is covered with the cover 20.

The touch panel 50 is a human interface laminated to a display device such as a liquid crystal display, and an organic EL display. For example, a user selects various recording conditions such as a type of medium M to be used and a recording mode by touching a guide image displayed on the display device via the touch panel 50. The control unit 6 detects a contact position in the touch panel 50 to identify input of various recording conditions. The touch panel 50 may employ a detection method using a capacitive system or a resistive film system.

Figure 4:
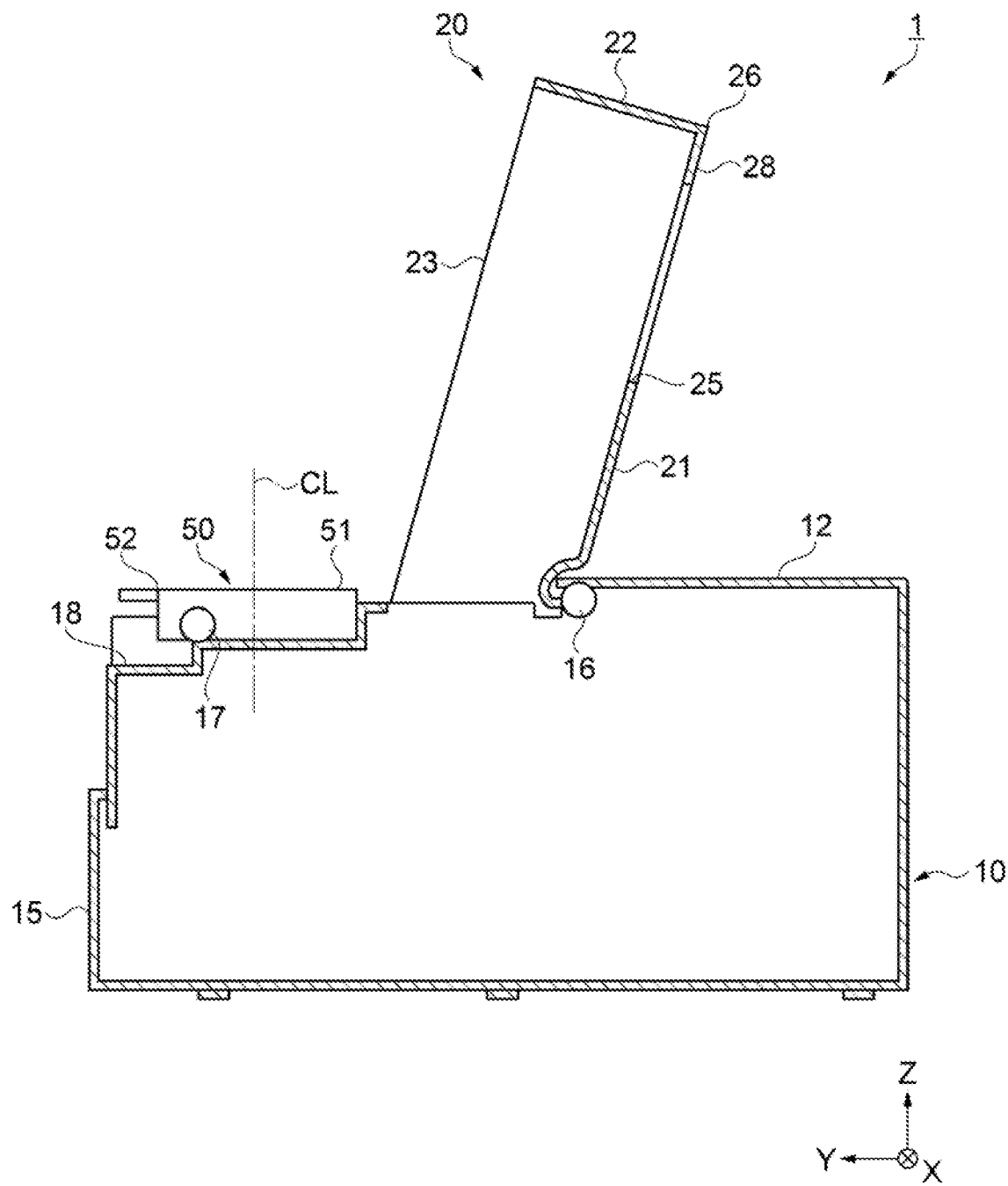
FIG. 4 is a cross-sectional view illustrating the printer with a touch panel in a horizontal state.
Figure 5:
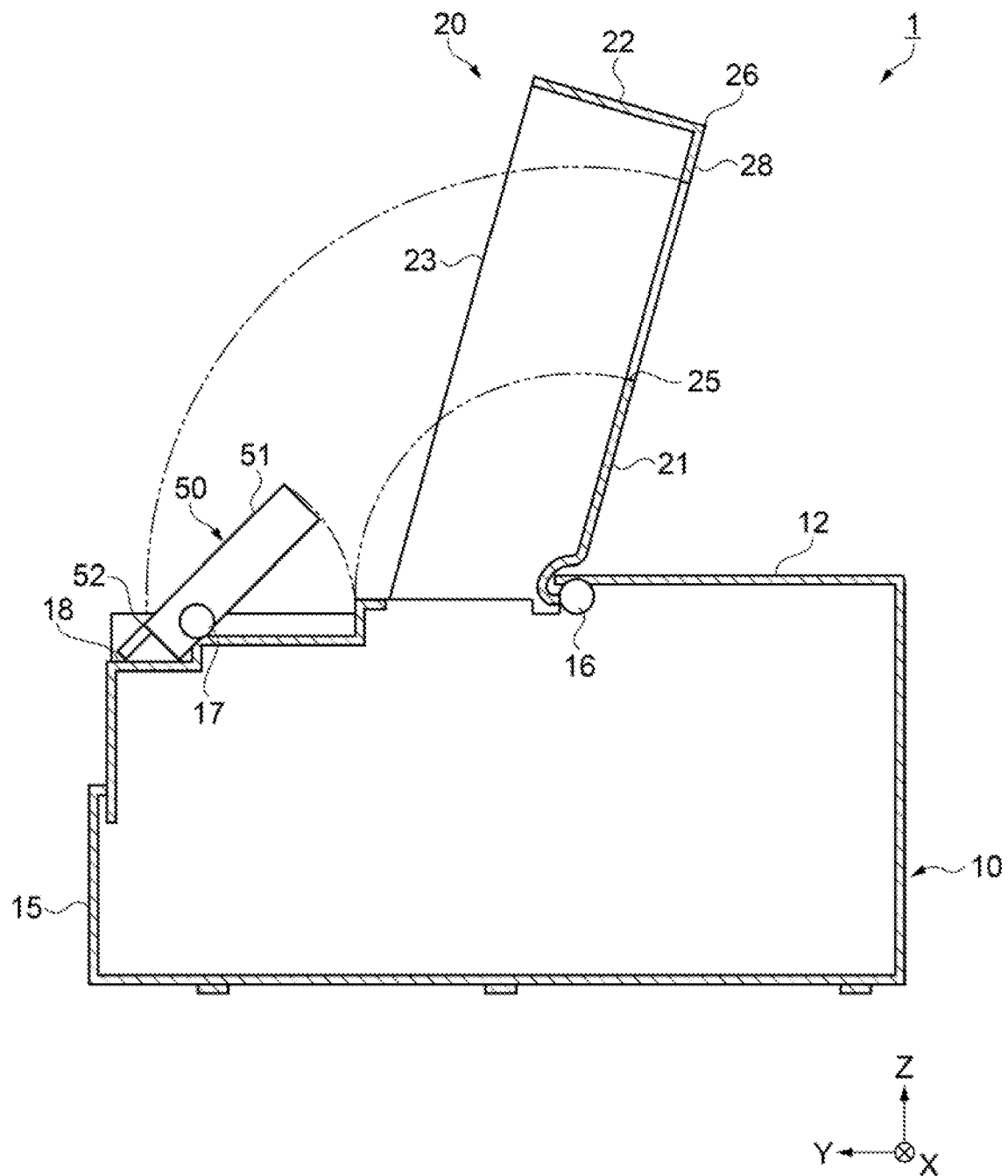
FIG. 5 is a cross-sectional view illustrating the printer with the touch panel in an inclined state.
Figure 6:
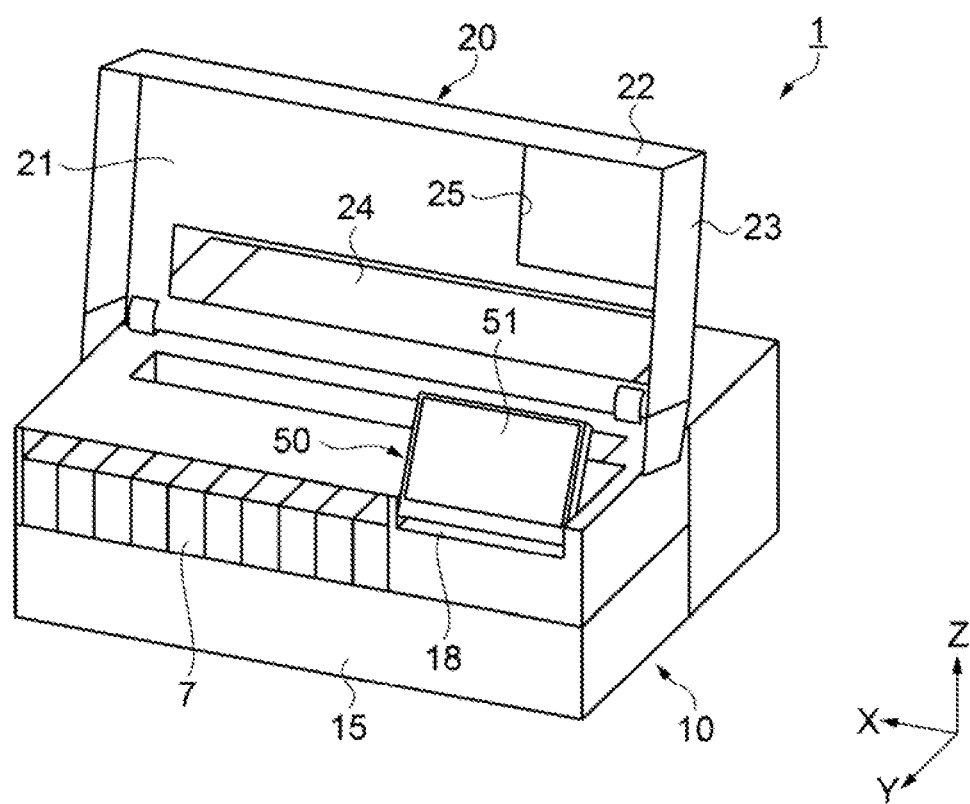
FIG. 6 is a perspective view illustrating the printer with the touch panel in the inclined state.

Next, a positional relationship between the touch panel 50 and the cover 20 will be described. FIG. 4 is a cross-sectional view illustrating the printer 1 with the touch panel 50 in a horizontal state. FIG. 5 is a cross-sectional view illustrating the printer 1 with the touch panel 50 in an inclined state. FIG. 6 is a perspective view illustrating the printer 1 with the touch panel 50 in an inclined state. Referring to FIG. 1 and FIG. 4 through FIG. 6, the touch panel 50 and the cover 20 will be described in detail. Note that in FIG. 5, rotational trajectories of the cover 20 and the touch panel 50 are illustrated.

As illustrated in FIG. 1 and FIG. 4, the cover 20 includes a first surface 21 that is a horizontal surface or X-Y plane in a closed state where the housing 10 is covered, and is disposed at a front of the medium support 12 with the medium supply port 11 being closed. The cover 20 is rotationally movable about an axis of a first rotating shaft 16 parallel to the first surface 21. In the embodiment, the first rotating shaft 16 is provided along a front-side end parallel to the X-axis of the medium support 12 with the medium supply port 11 of the housing 10 being closed. The cover 20 is displaceable in a closed state in which the first surface 21 covers the upper face of the housing 10 (see FIG. 1) and in an opened state illustrated in FIG. 2 in which the upper face of the housing 10 is not covered (see FIG. 2).

An opening 25 is formed in the first surface 21 of the cover 20. The opening 25 has a rectangle shape elongated in the X-axis direction and is located along a front edge 26 and a right edge 27 of the first surface 21. The touch panel 50 is located in the opening 25 when the cover 20 is in the closed state. That is, the touch panel 50 is provided at a front-side right end of the upper face of the housing 10. Even when the cover 20 is in the closed state, the opening 25 allows for an input operation to the touch panel 50.

The cover 20 includes a frame 28 between a front edge 26 of the first surface 21 and the opening 25 and includes a frame 29 between a right edge 27 of the first surface 21 and the opening 25. That is, the opening 25 and the touch panel 50 are provided at intervals corresponding to widths of the frames 28 and 29 from two sides contacting each other of the first surface 21. The touch panel 50 is guarded by the frames 28 and 29 of the first surface 21, and thus, it is possible to prevent an unintentional touch into the touch panel 50 by a user, that is, an unintentional erroneous input into the touch panel 50 as a result of the user's arm and the like coming closer to the touch panel 50 when the user rotates the cover 20 in the closed state to the opened state.

Further, the cover 20 includes a second surface 22 coupling to the first surface 21, and a third surface 23 coupling to the first surface 21 and the second surface 22. The first surface 21, the second surface 22, and the third surface 23 intersect one another. In the closed state of the cover 20, the second surface 22 forms an X-Z plane and the third surface 23 forms a Y-Z plane. That is, the cover 20 in the closed state covers the upper face of the housing 10 with the first surface 21, covers the front face with the second surface 22, and covers left and right side faces with the third surface 23. When the user rotates the cover in the closed state to the opened state, the touch panel 50 is guarded by the second surface 22 and the third surface 23 in addition to the frames 28 and 29 of the first surface 21, and thus, it is possible to further prevent an erroneous input into the touch panel 50. Additionally, the cover 20 includes the second surface 22 and the third surface 23 coupled to the first surface 21, and as a result, the rigidity of the cover 20 is improved.

Such a cover 20 can be formed integrally by extrusion-molding a plastic resin such as ABS resin or polycarbonate. Further, the first surface 21 of the cover 20 includes a window 24 which is processed to be transparent such that a user can see the recording unit 40 through the window 24. Even when the housing 10 is covered with the cover 20, a user can visually recognize, through the window 24, a recording operation state and a problem such as a paper jam.

Note that in the embodiment, the cover 20 including the first surface 21, the second surface 22, and the third surface 23 is described as an example, but may be a cover including only the first surface 21 covering the upper face of the housing 10. Even with such a cover, the touch panel 50 is guarded by the frames 28 and 29 of the first surface 21, and thus, an effect similar to the above may be exhibited.

In the embodiment, the cover 20 rotationally movable about the axis of the first rotating shaft 16 of which the axial direction is the X-axis is described as an example, but the present disclosure is not limited thereto. It is possible to employ a cover rotationally movable about the axis of a first rotating shaft of which the axial direction is the Y-axis or a first rotating shaft intersecting with the X-axis and the Y-axis.

In the embodiment, a configuration where the touch panel 50 and the opening 25 are provided at the front right end of the printer 1 is described as an example, but a configuration may be that the touch panel 50 and the opening 25 are provided at any location in the first surface 21 of the cover 20.

The touch panel 50 includes a fourth surface 51 defining a front surface, and the first surface 21 with the cover 20 being in the closed state and the fourth surface 51 of the touch panel 50 may be parallel to each other. As a result, the fourth surface 51 being the front surface of the touch panel 50 and the first surface 21 being the upper face of the cover 20 are flat, and thus, it is possible to prevent an unintentional erroneous input into the touch panel 50 when the user rotates the cover in the closed state to the opened state.

As illustrated in FIG. 4 and FIG. 5, the touch panel 50 is rotationally movable about an axis of a second rotating shaft 17 parallel to the fourth surface 51. In the closed state of the cover 20, the touch panel 50 is displaceable between a horizontal state (see FIG. 1 and FIG. 4) in which the first surface 21 of the cover 20 and the fourth surface 51 of the touch panel 50 are parallel and an inclined state (see FIG. 5) in which the fourth surface 51 is inclined from the horizontal state after rotationally moving about the axis of the second rotating shaft 17. In the embodiment, the second rotating shaft 17 is provided in the housing 10, that is, provided at a side of the touch panel 50 away from the first rotating shaft 16 or along the front end of the touch panel 50 parallel to the X-axis, when the touch panel 50 is in the horizontal state.

Further, the second rotating shaft 17 overlaps with the touch panel 50 in plan view from the Z-axis. In the embodiment, the second rotating shaft 17 is located between a bisector line CL for bisecting a length of the touch panel 50 along the Y-axis and the front edge 52 of the touch panel 50. In addition, a recessed portion 18 configured to prevent interference with the edge 52 when the touch panel 50 is rotated to be in the inclined state is formed in the housing 10 beneath the touch panel 50. In addition, as illustrated in FIG. 5 and FIG. 6, even when the touch panel 50 is in the inclined state, the cover 20 in the closed state can be brought into the opened state without interfering with the touch panel 50.

When the cover 20 is into the closed state and the touch panel 50 is into the inclined state, a region from a position at which the touch panel 50 overlaps the second rotating shaft 17 to the edge 52 is below the opening 25 of the cover 20. In addition, the touch panel 50 is in the inclined state behind the frame 28 of the cover 20. As a result, it is possible to prevent an unintentional erroneous input into the touch panel 50 by a user when the user rotates the cover 20 in the closed state to the opened state. In addition, in a case where the second rotating shaft 17 is provided at the position where the second rotating shaft 17 overlaps the touch panel 50, a length along the Y-axis of the touch panel 50 including the second rotating shaft is short as compared to a case where the second rotating shaft 17 is provided along the edge 52 at a position where the second rotating shaft 17 does not overlap the touch panel 50, and thus, the housing 10 can be made small.

Note that in the embodiment, the ink-jet type printer 1 is described as an example of the information processing device, but a laser type printer may be employed. The information processing device may be a printer, an image scanner, a facsimile, a telephone, a copying machine, and a multifunction machine where two or more functions are combined.

As described above, according to the printer 1 of the embodiment, the following advantages can be achieved.

The printer 1 includes the cover 20 configured to cover the housing 10, and the first surface 21 of the cover 20 includes the opening 25 through which the touch panel 50 is exposed. The cover 20 includes the frames 28 and 29 configured to guard the touch panel 50, and thus, it is possible to prevent an unintentional erroneous input into touch panel 50 caused when a user rotates the cover 20 to the opened state.

The cover 20 includes the second surface 22 and the third surface 23. When the user rotates the cover 20 to the opened state, the touch panel 50 is guarded by the second surface 22 and the third surface 23, and thus, it is possible to further prevent an unintentional erroneous input into the touch panel 50.

When the cover 20 is in the closed state, the fourth surface 51 being the front surface of the touch panel 50 and the first surface 21 being the upper face of the cover 20 are flat, and thus, it is possible to prevent an unintentional erroneous input into the touch panel 50 when the user rotates the cover 20 to the opened state.

The second rotating shaft 17 configured to rotates the touch panel 50 overlaps with the touch panel 50 in plan view. When the touch panel 50 is brought into the inclined state, a region from the position at which the touch panel 50 overlaps the second rotating shaft 17 to the edge 52 is below the opening 25 of the cover 20, and the touch panel 50 is in the inclined state behind the frame 28 of the cover 20. As a result, it is possible to prevent an unintentional erroneous input by the user when the user rotates the cover 20 to the opened state.

Note that, the present disclosure is not limited to the embodiments described above, and various modifications and improvements can be added to the above-described embodiments. Modifications are described below.

2. Modification 1

Figure 7:
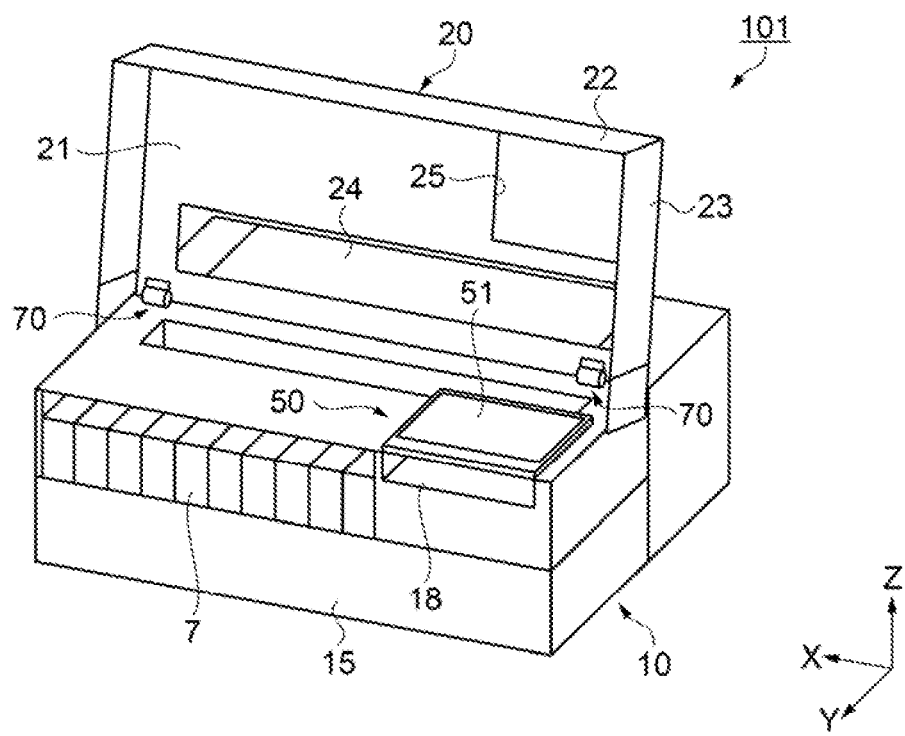
FIG. 7 is a perspective view illustrating a schematic configuration of a printer according to modification 1.
Figure 8:
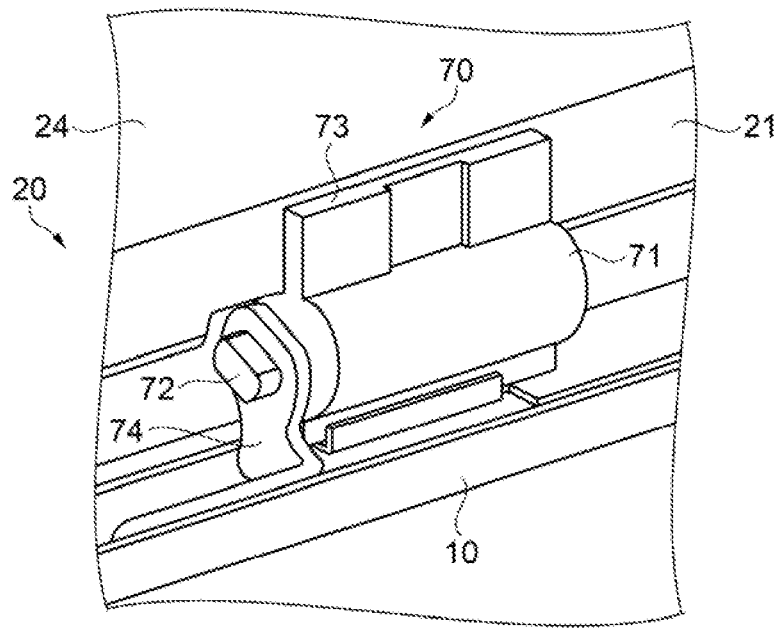
FIG. 8 is a perspective view illustrating an enlargement of a damper.

FIG. 7 is a perspective view illustrating a schematic configuration of a printer 101 according to modification 1. FIG. 8 is a perspective view illustrating an enlargement of a damper 70. A configuration of the printer 101 according to the modification 1 will be described. Further, the same constituents as those in the embodiment are given the same reference signs, and redundant description of these constituents will be omitted.

The printer 101 includes a plurality of the dampers 70. The cover 20 is coupled to the housing 10 via the dampers 70 configured to attenuate a rotating speed at which the cover 20 pivots around an axis of a shaft 72 serving as the first rotating shaft. The dampers 70 generate a resistance force in a direction opposite the rotational direction of the cover due to a frictional resistance. The damper 70 includes a cylinder part 71 having a cylindrical shape, the shaft 72 rotatably provided on an inner circumference of the cylinder part 71, the shaft 72 of which a first end protrudes from the cylinder part 71, a friction part (not illustrated) including a friction member sandwiched between the cylinder part 71 and the shaft 72, and the like. Examples of such a damper include a friction hinge damper manufactured by Fuji Latex Co., Ltd. (model: FHD-B1), and a free stop hinge manufactured by Nifco Inc. (model: Md4UR6).

The damper 70 includes a wing-like plate part 73 protruding in a normal direction from an outer periphery of the cylinder part 71, and the plate part 73 is attached to the first surface 21 of the cover 20 by a screw or the like (not illustrated). The first end of the shaft 72 is fixed to a first end of an attachment part 74 of which the first end includes an opening surrounding the outer periphery of the shaft 72, and a second end of the attachment part 74 is attached to the housing 10 by a screw or the like (not illustrated). In the modification, the cover 20 is coupled to the housing 10 by the two dampers 70. When the cover 20 is rotated, the shaft 72 rotates with respect to the cylinder part 71 and the frictional resistance generated by the friction member acts as a resistance force in a direction opposite the rotational direction, and as a result, an impact generated when the cover 20 is closed can be reduced. Thus, when closing the cover 20, the user can release a hand once the cover 20 in the opened state starts rotationally moving, under its own weight, in a direction of the closed state. That is, the user can release the hand away from the cover above the touch panel 50, and thus, it is possible to prevent an unintentional erroneous input into the touch panel 50 when the user rotates the cover 20 in the opened state to the closed state.

3. Modification 2

Figure 9:
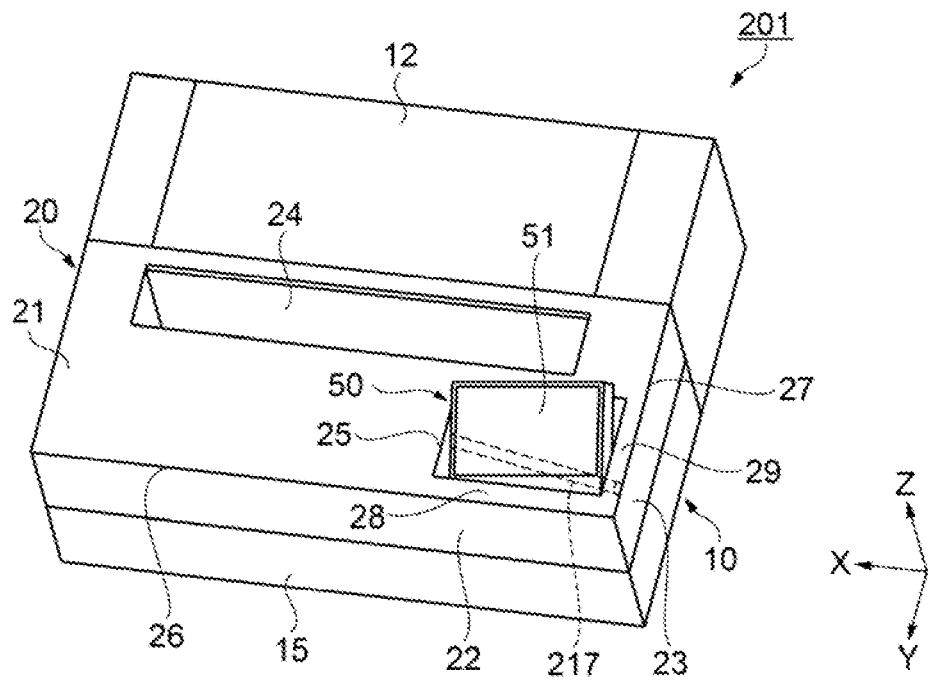
FIG. 9 is a perspective view illustrating a printer with a touch panel in an inclined state according to modification 2.
Figure 10:
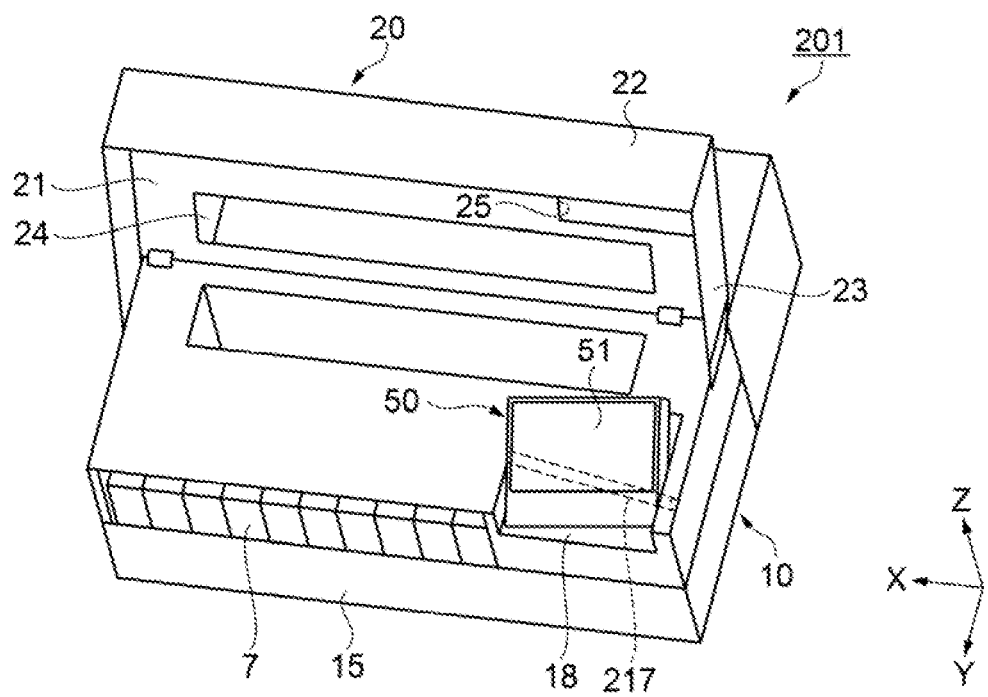
FIG. 10 is a perspective view illustrating a printer when a cover is in an opened state.

FIG. 9 is a perspective view illustrating a printer 201 with the touch panel 50 in an inclined state according to modification 2. FIG. 10 is a perspective view illustrating the printer 201 when the cover 20 is in the opened state. Firstly, a configuration of the printer 201 according to the modification 2 will be described. Further, the same constituents as those in the embodiment are given the same reference signs, and redundant description of these constituents will be omitted.

As illustrated in FIG. 9 and FIG. 10, the printer 201 includes a second rotating shaft 217 parallel to the fourth surface of the touch panel 50. The touch panel 50 is rotationally movable about an axis of the second rotating shaft 217. The second rotating shaft 217 is provided in the housing 10 and overlaps the touch panel 50 in plan view. The second rotating shaft 217 is inclined with respect to the edge 52 (see FIG. 4) of the touch panel 50 and intersects the X-axis and the Y-axis. Specifically, a left end of the second rotating shaft 217 is coupled to the housing 10 near the bisector line CL (see FIG. 4) of the touch panel 50 described in the embodiment, and a right end of the second rotating shaft 217 is coupled to the housing 10 at a position close to the edge 52 of the touch panel 50.

When the touch panel 50 pivots about the axis of the second rotating shaft 217 arranged thus, the fourth surface 51 of the touch panel 50 rises toward the side of the front face and inclines to the left side. As a result, the touch panel 50 is brought into an inclined state where the fourth surface 51 is inclined in a direction facing a user operating near a center at the side of the front face side of the printer 201, and thus, the visibility from the user is improved. In addition, when the user in front of the printer 201 rotates the cover 20 in the closed state to the opened state with a right hand of the user, the fourth surface 51 of the touch panel 50 is inclined to the left side, and thus, it is possible to prevent an unintentional erroneous input into the touch panel 50.

Contents derived from the Embodiments will be described below.

The information processing device includes a cover including a first surface formed with an opening, the cover being rotationally movable about an axis of a first rotating shaft parallel to the first surface, a housing coupled with the first rotating shaft, and a touch panel located in the opening when the cover is in a closed state where the cover covers the housing. The cover includes a frame between an edge of the first surface and the opening.

According to this configuration, the touch panel is located in the opening provided in the cover. When a user rotates the cover in the closed state to the opened state, the touch panel is guarded by the frame between the edge of the first surface and the opening. This can prevent an unintentional contact generated when the user's arm and the like come closer to the touch panel, that is, an unintentional erroneous input into the touch panel.

In the information processing device described above, the cover may include a second surface and a third surface coupled to the first surface, and the first surface, the second surface, and the third surface may intersect one another.

According to this configuration, the cover includes the second surface and the third surface being coupled to the first surface and intersecting each other. When the user rotates the cover in the closed state to the opened state, it is possible to further prevent an erroneous input into the touch panel because the touch panel is guarded by the second surface and the third surface in addition to the frame.

In the information processing device described above, the touch panel may include a fourth surface serving as a front surface, and may be rotationally movable about an axis of a second rotating shaft parallel to the fourth surface. In the closed state, the first surface and the fourth surface may be parallel to each other.

According to this configuration, the fourth surface of the touch panel and the first surface of the cover can be parallel to each other. As a result, the touch panel and the cover are flat, and thus, it is possible to prevent an unintentional erroneous input into the touch panel when the user rotates the cover in the closed state to the opened state.

In the information processing device described above, in a state in which the first surface and the fourth surface are parallel to each other, the second rotating shaft may be provided along an end at a side of the touch panel away from the first rotating shaft, and may overlap with the touch panel in plan view.

According to this configuration, the second rotating shaft is located at a position at which the second rotating shaft overlaps the touch panel. The second rotating shaft is closer to the center of the touch panel than the end at a side of the touch panel away from the first rotating shaft, and thus, a region from the position at which the touch panel overlaps the second rotating shaft to the frame is below the opening of the cover. As a result, it is possible to prevent an unintentional erroneous input into the touch panel by the user when the user rotates the cover in the closed state to the opened state.

In the information processing device described above, the cover may be coupled to the housing through a damper configured to attenuate a rotating speed at which the cover pivots about the axis of the first rotating shaft.

According to this configuration, the cover and the housing are coupled via the damper, and thus, it is possible to reduce the impact generated when the cover is closed. Thus, when closing the cover, the user can release a hand once the cover starts rotationally moving, under its own weight, in the closed direction. That is, the user can release the hand away from the cover above the touch panel, and thus, it is possible to prevent an unintentional erroneous input into the touch panel.

What is claimed is:

1. An information processing device, comprising:
    a cover including a first surface in which an opening is formed, the cover being configured to pivot about an axis of a first rotating shaft parallel to the first surface;
    a housing to which the first rotating shaft is configured to be coupled; and
    a touch panel which is configured to be located in the opening when the cover is in a closed state in which the cover covers the housing, wherein
    the cover includes a frame between an edge of the first surface and the opening; and
    the touch panel is configured to not be located in the opening when the cover is in an open state in which the cover does not cover the housing.

2. The information processing device according to claim 1, wherein
    the cover includes a second surface and a third surface, which are coupled to the first surface, and
    the first surface, the second surface, and the third surface intersect one another.

3. The information processing device according to claim 1, wherein
    the touch panel includes a fourth surface serving as a front surface and is configured to pivot about an axis of a second rotating shaft parallel to the fourth surface, and
    in the closed state, the first surface and the fourth surface are to be parallel to each other.

4. The information processing device according to claim 3, wherein in a state in which the first surface and the fourth surface are parallel to each other, the second rotating shaft is provided along an end of the touch panel at a side away from the first rotating shaft and overlaps the touch panel in plan view.

5. The information processing device according to claim 1, wherein the cover is coupled to the housing through a damper configured to attenuate a rotating speed of the cover pivoting about the axis of the first rotating shaft.

* * * * *